OR 3,836,224

United States Patent [19]

Strehlow et al.

[11] 3,836,224

[45] Sept. 17, 1974

[54] HOLDGRAM MEMORY READOUT SYSTEM

[75] Inventors: Wolfgang H. Strehlow, Twp. of Woodbury; Pui Kum Lee, White Bear Lake; James H. Packard, St. Paul, all of Minn.

[73] Assignee: Minnesota Mining & Manufacturing Company, St. Paul, Minn.

[22] Filed: Nov. 3, 1972

[21] Appl. No.: 303,326

[52] U.S. Cl. .................................. 350/3.5, 250/550

[51] Int. Cl. .......................................... G02b 27/00

[58] Field of Search ..................... 350/3.5; 331/94.5; 340/173 LT; 250/550, 553, 568, 578

[56] References Cited

UNITED STATES PATENTS

| | | | |
|---|---|---|---|
| 3,602,838 | 8/1971 | Stern | 331/94.5 |
| 3,608,994 | 9/1971 | McDonnell | 350/3.5 |
| 3,627,402 | 12/1971 | Gamblin | 350/3.5 |

OTHER PUBLICATIONS

Gamblin, IBM Technical Disclosure Bulletin, Vol. 11, No. 11, April 1969, pp. 1392–3.

Bogdankevich et al., Radiotekhnika i Electronika, Vol. 16, No. 5, Nov. 1971, pp. 847–850.

Packard et al., Applied Physics Letters, Vol. 19, No. 9, Nov. 1971, pp. 338–340.

*Primary Examiner*—Ronald J. Stern
*Attorney, Agent, or Firm*—Alexander, Sell, Steldt & DeLaHunt

[57] ABSTRACT

A two-dimensionally scannable electron beam laser is used to address a planar hologram array memory, having a plurality of holograms in a two-dimensional array, from each of which holograms a given order diffracted primary or conjugate image is produced at a common location when any said hologram in the array is addressed by a laser beam at an angle normal to the memory plane. A detector is positioned at the common location for receiving the image produced from each of the holograms in the array.

5 Claims, 6 Drawing Figures

HOLDGRAM MEMORY READOUT SYSTEM

BACKGROUND OF THE INVENTION

There is a demand for improvement in hologram memory readout systems. The present invention is directed to providing such a readout system having a rapid random access capability and a versatility of being able to read out information from any interchangeable hologram memory of a common type even if the memory was recorded with a physically separate system.

Prior art hologram array memory readout systems are described in "Hologram Memory for Storing Digital Data", by V. A. Vitols, IBM Technical Disclosure Bulletin, Vol. 8, No. 11, pages 1581–3, April 1966; in "A High Capacity Holographic Storage System", by J. Lipp and J. L. Reynolds, Applications of Holography, Plenum Press, 1971, pp. 377–388; and U.S. Pat. Nos. 3,530,442 and 3,651,485.

It was suggested by Bogdankevich et al in Radiotekhnika i Electronika, 16, No. 5 (1971) that it would be feasible to use a two dimensionally scannable electron beam laser having a plane-parallel semiconductor plate, in which excitation by an electron beam and lasing occur in a direction perpendicular to the plate surface, for providing rapid and random access of the information from a hologram memory; but how a system having such capability would be constructed was not described.

The most advanced prior art hologram readout systems utilize acousto-optic or electro-optic means of deflecting a laser beam to randomly address any hologram of the array for readout. Acousto-optic deflectors inherently provide relatively slow random access times. Electro-optic deflectors offer much faster random access times, but since they consist of multi-stage digital deflector elements, they suffer from the disadvantage of providing only fixed deflection positions characteristic of a given set of deflector elements. Thus it is difficult to produce holograms which may be interchangeably read out by different electro-optic deflection systems. Preferably an electro-optic deflection system used for readout should be integrated with the system for recording the memory in order to assure accuracy of addressability upon readout.

SUMMARY OF THE INVENTION

We have invented a hologram memory readout system which utilizes a two-dimensionally scannable electron beam laser to thereby provide rapid and random access of information from a hologram array memory. Our readout system is entirely separate from the system for recording the hologram array memory, and may be used to read out information from any interchangeable hologram array memory having a plurality of holograms in an array, from each of which holograms a given order diffracted primary or conjugate image is produced at a common location when any said hologram in the array is addressed by a laser beam at an angle normal thereto.

Our hologram memory readout system is capable of reading any such hologram array memory having a plurality of holograms in a planar two-dimensional array. This system comprises a memory station for receiving the hologram array memory; and a two-dimensionally scannable electron beam laser having a planar output surface for emitting a laser beam in a diverging cone having an axis normal to said output surface, and a system of lenses positioned in combination with said laser for scanning the hologram array memory to address any hologram in the hologram array memory with a laser beam at an angle normal to the memory plane for producing a said image at the common location from the addressed hologram and for focusing the laser beam to selected spot size at the plane of the array; and preferably further comprises a detector positioned at the common location for receiving said image produced from each of the holograms in the hologram array memory. The memory station is located at substantially the image of the laser output surface formed by said system of lenses.

For optically reading in parallel a plurality of bits in a common predetermined pattern represented in each of the holograms of the planar hologram array memory, the detector of the readout system contains a plurality of sensors in a corresponding common predetermined pattern.

Preferrably the electron beam laser comprises an electron gun for producing an electron beam; a planar laser cavity positioned parallel with the planar hologram array memory, and comprising laser material for emitting a laser beam normal to the cavity plane when excited into a stimulated emission state by the electron beam; and means for deflecting the electron beam to provide the laser beam from a selected location on the cavity for addressing any hologram in the hologram array memory for reconstructing at the detector, an image from the addressed hologram.

The electron beam laser emits said laser beam in a diverging cone from the selected locations within the planar area of the laser cavity. Thus it is preferable that the readout system further includes a system of lenses for addressing any hologram of the array with a laser beam of a selected spot size, and for providing a correspondingly larger area in the memory plane over which the emitted laser beam can be addressed at an angle normal to the memory plane. By providing such a larger addressable memory plane area, more information can be provided on the hologram array memory. Each hologram must have at least some finite minimum size. According to the present state of art holograms with a diameter of about 100 micrometers approach this minimum size. Thus, whereas only about $2^{16}$ such holograms can be recorded in an addressable area slightly larger than 1 square inch ($2.54^2$ $cm^2$), approximately $2^{20}$ holograms can be recorded in an addressable area slightly larger than sixteen square inches ($10^2$ $cm^2$). It is important to remember, however, that as the addressable area is magnified the spot size of the laser beam at the memory plane is also magnified. Thus the dimensions and spacing of each hologram in the hologram array memory must be such that the laser beam spot in the memory plane does not overlap any adjacent hologram.

DESCRIPTION OF THE PREFERRED EMBODIMENT

Figure 1:
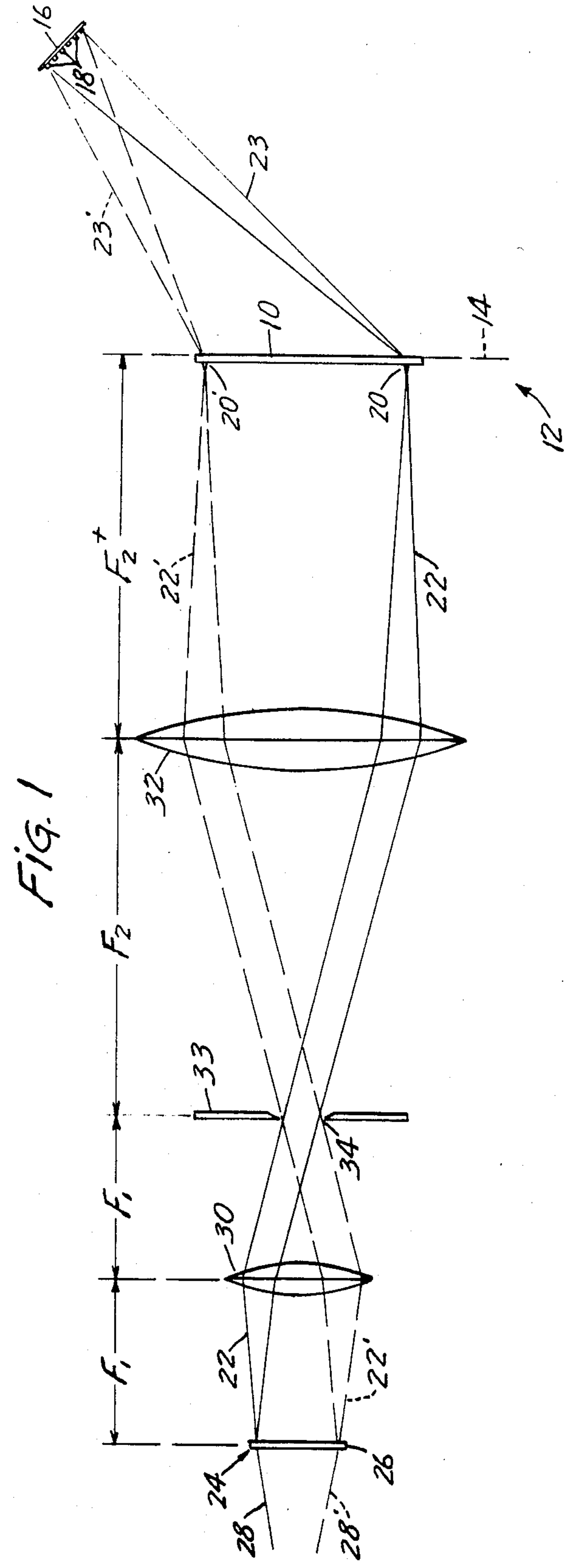
FIG. 1 is a schematic view of a hologram memory readout system according to the present invention.

A preferred hologram array readout system is illustrated in FIG. 1. A hologram array memory 10 is received at a memory station 12 defining a memory plane 14. A detector 16 containing an array of sensors 18 is positioned rearward and to one side of the hologram array memory 10 for receiving a diffracted image from each of the holograms 20, 20' in the array of memory 12, when such hologram is addressed by a laser beam 22, 22' at an angle normal to the memory plane 14. The angle between the diffracted beam 23, 23' and the transmitted beam should be such that none of the transmitted beam 22, 22' reaches the detector 16.

The laser beam 22, 22' is provided from a twodimensionally scannable electron beam laser 24, which has a planar laser cavity 26. The laser beam 22, 22' is emitted in a diverging cone from the laser cavity 26 when the cavity is excited into a stimulated emission state by an electron beam 28, 28'. The emitted laser beam 22, 22' is normal to the broad planar surface of the laser cavity 26.

The readout system further has a system of lenses 30 and 32 for converging the laser beam 22, 22' to address any hologram 20, 20' with a laser beam of a suitable spot size. The spot size of the laser beam 22, 22' at the memory plane 14 should be selected to be of such diameter as to impinge upon only the hologram 20, 20' in order to address only one hologram at a time.

The lenses 30 and 32 may be so selected as to provide a larger area in the memory plane 14, over which the laser beam 22, 22' can be addressed at an angle normal to the memory plane, in relation to the area of the laser cavity 26 containing the selected areas from which the laser beam 22, 22' can be emitted.

An aperture plate 33 defining an aperture 34 is provided between the lenses 30 and 32 to minimize interference from any stray light. The lens 30 is positioned midway between the laser cavity 26 and the aperture 34, being displaced a distance corresponding to its focal length $F_1$ from each, 26 and 34. The lens 32 is displaced a distance equal to its focal length $F_2$ from the aperture 34. The memory plane 14 is spaced from the lens 32 at a distance slightly greater than its focal length $F_2$ so as to provide a diverging laser beam for readout. A diverging beam is preferred for readout when a converging reference beam is used in recording holograms, as is described below with reference to FIG. 4. The provided magnification is approximately equal to the ratio of focal lengths; $F_2/F_1$.

Figure 2:
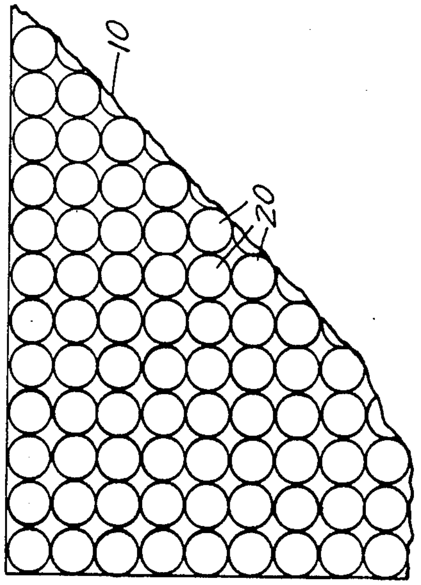
FIG. 2 is a plan view of a portion of a planar hologram array memory which may be read with the system of FIG. 1.

Referring to FIG. 2 the planar hologram array memory 10 includes a two-dimensional array of tightly packed holograms 20. In the preferred embodiment each hologram 20 is approximately 100 micrometers in diameter. Thus a planar memory 10 slightly larger than 1 square inch ($2.54^2 cm^2$) may contain 256 vertical rows and 256 horizontal rows of holograms, or a total of $2^{16}$ holograms.

Figure 3:
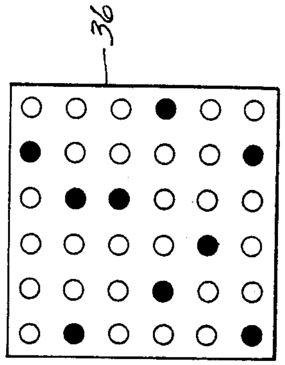
FIG. 3 is a plan view of a predetermined pattern of data bits which is represented in the holograms in the hologram array memory of FIG. 2.

Each hologram represents a predetermined pattern of data bits, such as the pattern illustrated in FIG. 3, wherein a 6 by 6 bit array is illustrated. This predetermined bit pattern is such that after compensating for any differences in the wavelengths of the recording and readout laser beams, its reconstructed image corresponds to the predetermined pattern in which the sensors 18 are arranged in the detector 16.

Figures 4, 5:
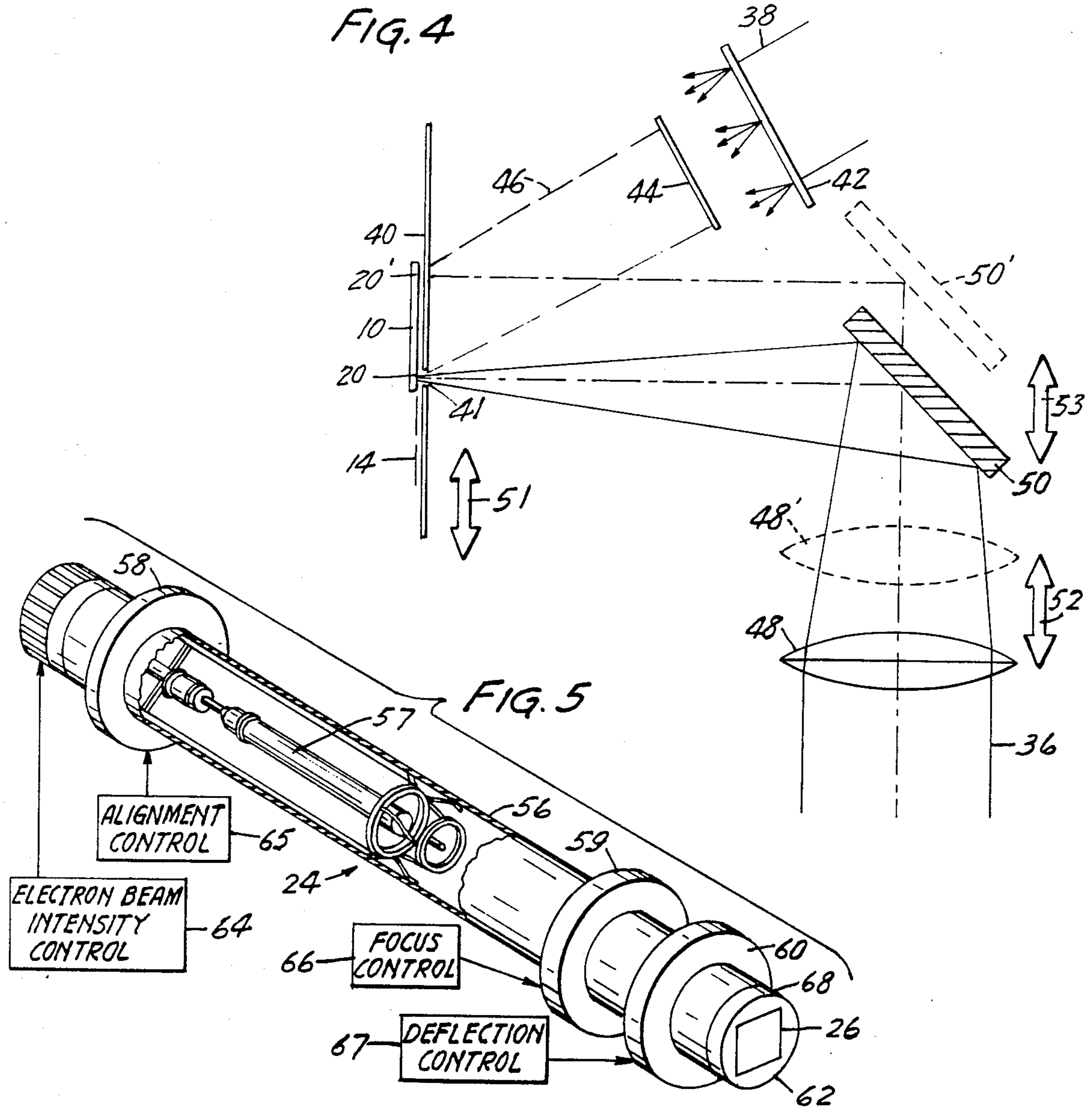
FIG. 4 is a schematic view of a system for recording the hologram array memory which is read with the system of FIGS. 1 or 6.
FIG. 5 is a view of an electron beam laser included in the system of FIG. 1 with a portion of the tube cut away in order to illustrate the electron gun.
Figure 6:
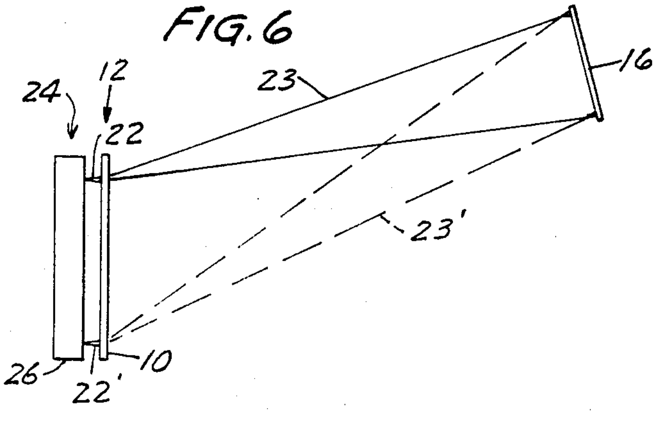
FIG. 6 is a schematic view of an embodiment of a hologram memory readout system according to the present invention, alternative to that shown in FIG. 1.

The planar hologram array memory 10 which is read out with the system of FIGS. 1 or 6 can be recorded with the system schematically illustrated in FIG. 4. The memory medium 10 is a photosensitive material which is held in a stationary position for recording. Both the reference beam 36 and the object beam 38 are parallel laser beams provided from a common stationary argon ion laser source (not shown).

A movable aperture plate 40 containing an aperture 41 is positioned in front of the memory medium 10 to enable only a 100 micrometer diameter circle of the medium 10 to be exposed at any one time.

The parallel object beam 38 is scattered by a stationary light diffuser 42 and illuminates a page composer 44 which contains an image of data bits in predetermined pattern, such as the pattern of FIG. 3. Light 46 from the page composer 44 floods an area corresponding to that of the memory medium 10 covered by the aperture plate 40 and interferes with the reference beam 36 to form a hologram 20, on the portion of the memory medium 10 which is exposed through the aperture 41.

The parallel reference beam 36 is projected through a movable translating lens 48 and reflected off of a movable mirror 50 to always impinge upon the memory medium 10 in a direction normal to the memory plate 14. The lens 48 converts the parallel reference beam 36 into a convergent beam of a constant cone angle.

To record a linear array of holograms 20 on the memory medium 10, the aperture plate 40, the translating lens 48 and the mirror 50 are moved in unison by the same distance and in the same direction for each newly recorded hologram 20', as illustrated by the positions of the respective elements 48' and 50', and by the two headed arrows 51, 52 and 53.

A second mirror (not shown) which also moves in unison with the aperture plate 40, the translating lens 48 and the mirror 50, and a third mirror (not shown) which is stationary enables the reference beam to be traversed in a direction orthogonal to that shown in FIG. 4, to permit recording of adjacent parallel linear arrays and thus to record a two-dimensional array of holograms, such as is shown in FIG. 2.

The two-dimensionally scannable electron beam laser 24 used in the hologram memory readout system of FIG. 1, is illustrated in FIG. 5. The electron beam laser 24 includes a sealed evacuated tube envelope 56 containing an electron gun 57, an alignment coil 58, a focus coil 59, a deflection coil 60 and a laser cavity 26 comprising a broad direct band-gap semiconductor crystal 26 which is bonded to the inside surface of a transparent sapphire face plate 62.

An electron beam intensity control circuit 64, an alignment control circuit 65, a focus control circuit 66 and a deflection control circuit 67 are also provided.

The laser cavity 26 includes a polished wafer of a direct band-gap semiconductor crystal. Semiconductor materials which have been found to be suitable include cadmium sulfide, cadmium selenide, cadmium sulfur selenide and gallium arsenide. A crystal which will lase at room temperature is selected in accordance with the process described in U.S. Pat. application Ser. No. 135,369, filed Apr. 19, 1971. The semiconductor crystal is polished to provide two plano-parallel faces. The spacing between the two faces then determines the cavity thickness, which is on order of 10 to 50 micrometers. The two lateral broad dimensions of the cavity are about one inch (2.54 cm). The crystal faces are mirrored such as by vapor coating with silver or aluminum in order to achieve a reflectivity of about 96 percent and about 92 percent on the bombarded and opposite crystal faces respectively. The crystal may also be reflectively coated with a multiple layer dielectric such as a composition of alternate layers of cryolite and zinc sulfide.

The sapphire face plate 62 is secured to the glass tube envelope 56 by means of an indium seal (not shown) and a brass ring anode 68. The inside surface of this end of the glass tube envelope 56 is covered by a graphite coating which contacts the indium seal, which in turn contacts the brass ring anode 68. The graphite coating extends to also contact the anode clips of the electron gun 57.

The brass ring anode 68 is grounded when the laser 24 is installed for operation, and a negatively biased voltage source (not shown) is connected to the electron gun cathode contacts (not shown).

In operation, an electron beam generated by the electron gun 57 bombards the inside face of the crystal laser cavity 26. The electron beam is focused such that the spot size is on the order of a diameter of about 25 micrometers. The electron beam energy is selected to be in a range between 20 keV and 50 keV. The current density is of the order of ten amperes/cm$^2$, and is in excess of the threshold level needed to excite stimulated emission in the crystal laser cavity 26. A laser beam emerges through the opposite face of the crystal laser cavity 26 at a location opposite to the location bombarded by the electron beam.

Deflection of the electron beam from the electron gun 57 to any selected location of the broad bombarded surface of the crystal laser cavity 26 thus results in the generation of a laser beam from a corresponding location of the broad opposite planar surface of the crystal laser cavity 26. The laser beam is emitted in a diverging cone which is normal to this opposite surface. The electron beam is impinged upon the crystal laser cavity 26 in a pulsed mode with a pulse width of between 10–100 nanoseconds. The rise time and decay time of the laser emission is of the order of a few nanoseconds. Thus, the laser beam pulse generally corresponds to the electron beam pulse. Further description of two-dimensionally scannable electron beam lasers is contained in U.S. Pat. No. 3,757,250.

In an even less complex alternative embodiment, as shown in FIG. 6, the system of lenses 30 and 32 is dispensed with and the laser cavity 26 is positioned closely adjacent the memory station 12 for scanning the received hologram array memory 10 with a diverging laser beam 22, 22'. In other respects, the system of FIG. 6 is the same as the system shown in FIG. 1, discussed hereinabove. However, the addressable area of the hologram array is determined by the broad planar area of the laser cavity 26.

In another preferred embodiment where our system is used to read-out such graphic images as a page from a telephone directory or a catalog, the detector comprises a ground glass plate for receiving the image. Alternatively, the detector can be dispensed with and the image is detected by the human eye at the common location.

We claim:

1. A hologram memory readout system for reading a hologram array memory having a plurality of holograms in a two-dimensional planar array, from each of which holograms a given order diffracted image is produced at a common location when any said hologram in the array is addressed by a laser beam, which system comprises a memory station for receiving a said planar hologram array memory, and a two-dimensionally scannable electron beam laser having a planar output surface for emitting a laser beam in a diverging cone having an axis normal to said output surface, and a system of lenses positioned in combination with said laser for scanning said hologram array memory to address any hologram in the hologram array memory with a laser beam at an angle normal to the plane of the array for producing a said image at said common location from said addressed hologram, and for focusing the laser beam to a selected spot size at the plane of the array, said memory station being located at substantially the image of the laser output surface formed by said system of lenses.

2. A hologram memory readout system for reading a hologram array memory having a plurality of holograms in a two-dimensional planar array, from each of which holograms a given order diffracted image is produced at a common location when any said hologram in the array is addressed by a laser beam, which system comprises a memory station for receiving a said planar hologram array memory; and a two-dimensioanlly scannable electron beam laser having a planar output surface for emitting a laser beam in a diverging cone having an axis normal to said output surface, and a system of lenses positioned in combination with said laser for scanning said hologram array memory to address any hologram in the hologram memory with a laser beam focused to a selected spot size at the plane of the array for reading out a hologram of not greater than about 100 micrometers in diameter without the beam overlapping any adjacent hologram in an array of tightly packed holograms, and at an angle normal to the plane of the array for producing a said image at said common location from said addressed hologram;

said memory station being located at substantially the image of the laser output surface formed by said system of lenses.

3. A hologram memory readout system for reading a hologram array memory having a plurality of holograms in a two-dimensional planar array, from each of which holograms a given order diffracted image is produced at a common location when any said hologram in the array is addressed by a laser beam, which system comprises a memory station for receiving a said planar hologram array memory;

a two-dimensionally scannable electron beam laser having a planar output surface for emitting a laser beam in a diverging cone having an axis normal to said output surface, and a system of lenses positioned in combination with said laser for scanning said hologram array memory to address any hologram in the hologram memory with a laser beam focused to a selected spot size at the plane of the array, and at an angle normal to the plane of the array for producing a said image at said common location from said addressed hologram; and a detector positioned at said common location for receiving said image produced from each of the holograms in said hologram array memory;

said memory station being located at substantially the image of the laser output surface formed by said system of lenses.

4. A hologram memory readout system for optically reading in parallel a plurality of bits in a common predetermined pattern represented by a hologram on a hologram array memory having a plurality of holograms in a two-dimensional planar array, from each of which holograms a given order diffracted image is produced at a common location when any said hologram in the array is addressed by a laser beam, which system comprises a memory station for receiving a said planar hologram array memory;

a two-dimensionally scannable electron beam laser having a planar output surface for emitting a laser beam in a diverging cone having an axis normal to said output surface, and a system of lenses positioned in combination with said laser for scanning said hologram array memory to address any hologram in the hologram memory with a laser beam focused to a selected spot size at the plane of array, and at an angle normal to the plane of the array for producing a said image at said common location from said addressed hologram; and a detector containing a plurality of sensors in a pattern corresponding to the common predetermined pattern, positioned at said common location for receiving said image produced from each of the holograms in said hologram array memory for optically reading in parallel said plurality of bits represented by each hologram;

said memory station being located at substantially the image of the laser output surface formed by said system of lenses.

5. A hologram memory readout system for optically reading in parallel a plurality of bits in a common predetermined pattern represented by a hologram on a hologram array memory having a plurality of holograms in a two-dimensional planar array, from each of which holograms a given order diffracted image is produced at a common location when any said hologram in the array is addressed by a laser beam, which system comprises a memory station for receiving a said planar hologram array memory;

a two dimensionally scannable electron beam laser having a planar output surface for emitting a laser beam in a diverging cone having an axis normal to said output surface, and a system of lenses positioned in combination with said laser for scanning said hologram array memory to address any hologram in the hologram memory with a laser beam focused to a selected spot size at the plane of the array for reading out a hologram of not greater than about 100 micrometers in diameter without the beam overlapping any adjacent hologram in an array of tightly packed holograms, and at an angle normal to the plane of the array for producing a said image at said common location from said addressed hologram; and a detector containing a plurality of sensors in a pattern corresponding to the common predetermined pattern, positioned at said common location for receiving said image produced from each of the holograms in said hologram array memory for optically reading in parallel said plurality of bits represented by each hologram;

said memory station being located at substantially the image of the laser output surface formed by said system of lenses.

* * * * *